United States Patent [19]

Maeda et al.

[11] Patent Number: 4,949,331
[45] Date of Patent: Aug. 14, 1990

[54] APPARATUS AND RECORD CARRIER FOR OPTICAL DISC MEMORY WITH CORRECTION PATTERN AND MASTER DISC CUTTING APPARATUS

[75] Inventors: Takeshi Maeda, Kokubunji; Yoshito Tsunoda, Mitaka; Kazuo Shigematsu, Saitama; Toshimitsu Kaku, Sagamihara, all of Japan

[73] Assignee: Hitachi, Ltd., Tokyo, Japan

[21] Appl. No.: 875,442

[22] Filed: Jun. 17, 1986

[30] Foreign Application Priority Data

Jun. 19, 1985 [JP] Japan .................. 60-131850
Dec. 6, 1985 [JP] Japan .................. 60-273227

[51] Int. Cl.$^5$ .............................................. G11B 3/78
[52] U.S. Cl. ..................... 369/275.3; 369/277; 369/278; 369/109; 369/111; 369/44.37
[58] Field of Search ..................... 369/43, 44, 45, 93, 369/109, 111, 275, 277, 278; 358/342, 343

[56] References Cited

U.S. PATENT DOCUMENTS

| | | | |
|---|---|---|---|
| 4,094,013 | 6/1978 | Hill et al. | 369/44 X |
| 4,392,219 | 7/1983 | Yokozawa et al. | 369/277 X |
| 4,417,290 | 11/1983 | Tanaka et al. | 369/13 X |
| 4,423,502 | 12/1983 | Dil | 369/93 X |
| 4,445,820 | 4/1984 | Hazel et al. | 369/275 X |
| 4,535,439 | 8/1985 | Satoh et al. | 369/275 |
| 4,569,038 | 2/1986 | Nagashima et al. | 369/111 X |
| 4,663,751 | 5/1987 | Kaku et al. | 369/46 |

FOREIGN PATENT DOCUMENTS

| | | | |
|---|---|---|---|
| 0064438 | 11/1982 | European Pat. Off. | |
| 0080212 | 6/1983 | European Pat. Off. | |
| 0083193 | 7/1983 | European Pat. Off. | |
| 0089274 | 9/1983 | European Pat. Off. | |
| 100995 | 2/1984 | European Pat. Off. | 358/275 |
| 0108258 | 5/1984 | European Pat. Off. | 369/275 |
| 0178116 | 4/1986 | European Pat. Off. | 369/275 |
| 2634243 | 2/1978 | Fed. Rep. of Germany | |
| 2321164 | 8/1975 | France | 369/275 |
| 2504301 | 10/1982 | France | |

(List continued on next page.)

OTHER PUBLICATIONS

English translation of JP 59-38939 (Mar. 84), pp. 1-7.
IBM Tech. Disclosure Bulletin, vol. 26, No. 7B, Dec. 1983, "Optical Recording Format"; Acter et al.
RCA Review; Mar. 1978, vol. 39, No. 1, pp. 61; 75; 78.

Primary Examiner—Aristotelis M. Psitos
Attorney, Agent, or Firm—Antonelli, Terry, Stout & Kraus

[57] ABSTRACT

A record carrier having a disc-shaped substrate and a recording layer for optically writing information therein is disclosed which includes a guide groove extended in the rotational direction of the record carrier so that a plurality of revolutions of the guide groove are spaced apart from each other in radial directions of the record carrier, and a pit pattern provided between adjacent guide grooves, at positions arranged at intervals in the above rotational direction, for detecting the deviation of a light spot from the center line between adjacent guide grooves. The recording/reproducing operation for this record carrier is performed in such a manner that the first tracking error signal is detected from diffracted light from the guide groove, the second tracking error signal is detected from the pit pattern, and information is recorded in and reproduced from a land formed between adjacent guide grooves in a state that a tracking operation is performed using the first and second tracking error signals. The second tracking error signal detected from the pit pattern is not affected by the tilting of the record carrier and the movement of the light spot. When a tracking signal obtained by adding the first and second tracking error signals to each other, is used in a closed-loop tracking system, a stable tracking operation can be performed. The polarity of the pit pattern is reversed on every track, and hence a polarity pit having a depth of $\lambda/4$ (where $\lambda$ indicates the wavelength of a reproducing light beam) is provided in the record carrier, to reverse the polarity of the second tracking signal on every track on the basis of a signal from the polarity pit.

13 Claims, 12 Drawing Sheets

FOREIGN PATENT DOCUMENTS

| | | |
|---|---|---|
| 2517103 | 5/1983 | France . |
| 58-041446 | 3/1983 | Japan . |
| 58-41446 | 3/1983 | Japan . |
| 58-102338 | 6/1983 | Japan ............................... 369/275 |
| 58-102347 | 6/1983 | Japan ............................... 369/275 |
| 58-155528 | 9/1983 | Japan ............................... 369/275 |
| 58-169337 | 10/1983 | Japan . |
| 58-169341 | 10/1983 | Japan . |
| 58-203636 | 11/1983 | Japan . |
| 59-19250 | 1/1984 | Japan . |
| 59-038939 | 3/1984 | Japan . |
| 59-38939 | 3/1984 | Japan . |
| 59-101043 | 6/1984 | Japan ............................... 369/109 |
| 59-168939 | 9/1984 | Japan . |
| 59-223945 | 12/1984 | Japan . |
| 59-227039 | 12/1984 | Japan ............................... 369/278 |
| 60-76028 | 6/1985 | Japan ............................... 369/275 |
| 61-013458 | 1/1986 | Japan . |
| 7703865 | 4/1977 | Netherlands . |
| 1435299 | 5/1976 | United Kingdom ................. 369/111 |

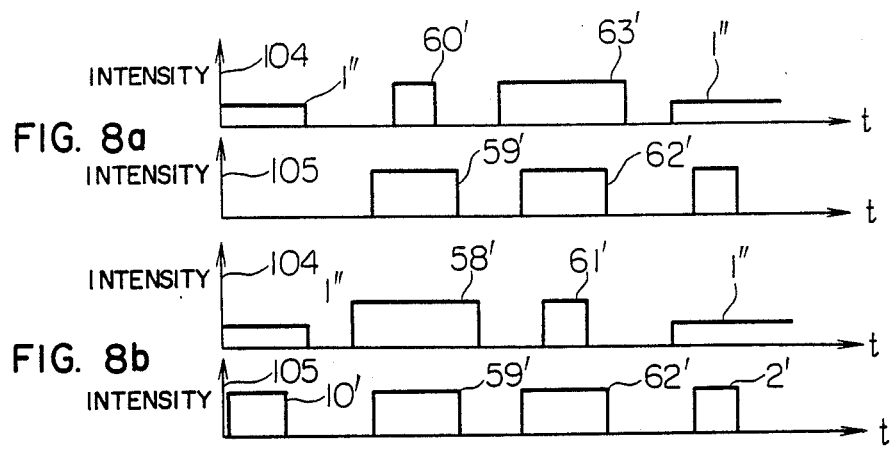
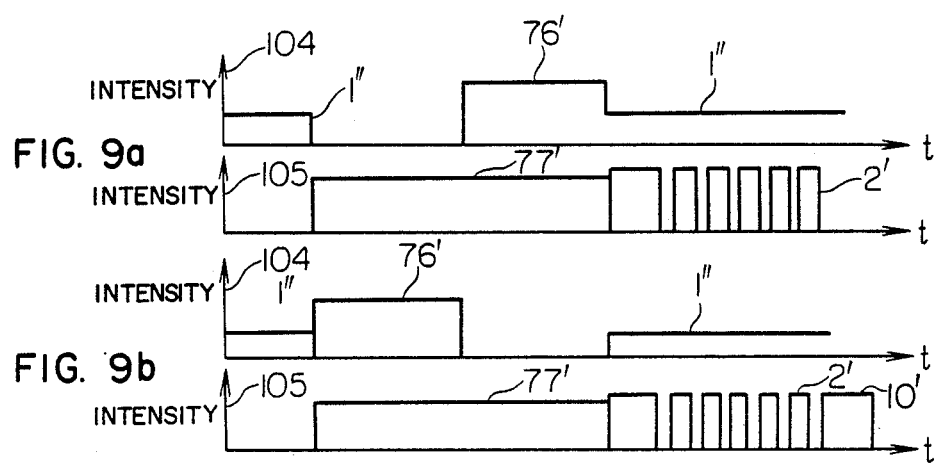

APPARATUS AND RECORD CARRIER FOR OPTICAL DISC MEMORY WITH CORRECTION PATTERN AND MASTER DISC CUTTING APPARATUS

BACKGROUND OF THE INVENTION

The present invention relates to an optical record carrier such as an optical disc and an information recording/reproducing apparatus for the optical record carrier, and more particularly to an optical record carrier suited for performing a stable tracking operation and an information recording/reproducing apparatus for such an optical record carrier. Further, the present invention relates to a master disc cutting apparatus for forming a master disc suitable for mass producing a record carrier in which a guide groove, header pits, and a tracking-error detecting pit pattern are previously formed.

An apparatus for recording information in a land existing between adjacent pregrooves and for reproducing the recorded information is proposed in Japanese Patent Application Unexamined Publication No. 58-41446. In this apparatus, the deviation of a light spot from a track is detected by using a 3-spot tracking servo mechanism. However, the deviation of the light spot from a track can also be detected by a change in diffracted light pattern from the guide groove. In this case, there arises a problem that an offset occurs on the basis of a change in intensity distribution of diffracted light on a photodetector which is caused by the tilting of a record carrier, the movement of the light spot, or others. Means for reducing such a track offset is disclosed in, for example, Japanese Patent Application Unexamined Publication No. 59-19250 (corresponding to U.S. application Ser. No. 515,520 now U.S. Pat. No. 4,663,751, and EPC application Appln. No. 83107110.5).

SUMMARY OF THE INVENTION

It is the first object of the present invention to provide a record carrier capable of correcting a track offset which is caused by the tilting of a record carrier (that is, an optical disc) or others when information is optically recorded in and reproduced from a land existing between adjacent guide grooves, and an information recording/reproducing apparatus for the above record carrier.

It is the second object of the present invention to provide a master disc cutting apparatus capable of forming a tracking-error detecting pit pattern, a guide groove and header pits in a master disc without wobbling a cutting light beam.

In order to attain the first object, according to the present invention, a pit pattern for detecting the deviation of a light spot from a track without being affected by the tilting of a record carrier (that is, an optical disc), the movement of the light spot, or others, is previously formed in the record carrier at positions arranged at intervals in a direction in which information is recorded and reproduced, an errorless, tracking-error signal is intermittently detected from the pit pattern, another tracking error signal is obtained by using diffracted light from a guide groove which is previously formed in the record carrier, and a stable, accurate tracking operation is performed in a wide frequency range from a high frequency to a low frequency by using the two tracking error signals.

In a record carrier according to the present invention, a guide groove which serves as an optical guide and can be optically detected, is previously formed spirally or concentrically, to record information in a land existing between adjacent grooves, along these grooves. Thus, the center line of a recording track is identical with the center line between adjacent guide grooves. Further, a pit pattern for detecting the true deviation of a light spot from a track without being affected by the tilting of the record carrier, the movement of the light spot, or others is formed in the record carrier at positions arranged at intervals along the groove, in the form of the unevenness of the surface of the record carrier. In other words, the pit pattern has a phase structure. Further, each of the recording tracks is divided into a plurality of sectors, each of which has a header field in which a header signal including a sector mark, address information and synchronizing information is recorded, and a recording field in which data is recorded by a user. The header signal is recorded in a land existing between adjacent guide grooves in the form of pits which indicates the unevenness of the surface of the land. In the recording field, data is recorded in various manners in accordance with the characteristics of a recording layer of the record carrier. In order to form a pit pattern capable of detecting the true deviation of a light spot from a track, the first portion of the pit pattern is formed in the guide groove at positions arranged at intervals so that the first portion has the same center line as that of the guide groove and is different in optical characteristic from the guide groove. The first portions of adjacent guide grooves are provided so as not to overlap each other when viewed in a radial direction. The first portion may be one of a mirror-like surface portion obtained by interrupting the guide groove, a phase pit (namely, a pit with a phase structure) different in width from the guide groove, and a phase pit different in depth from the guide groove. When the light spot tracing the center line between adjacent guide grooves passes through a pair of pit patterns each formed by the first portion, the light quantity reflected from the guide grooves varies as if the guide grooves were wobbled. By using the first portion, the deviation of the light spot from a track can be detected without being affected by the track offset which is caused by the tilting of the record carrier or the movement of the light spot. Further, the second portion which is different in optical characteristic from the guide groove, may be formed in a land sandwiched between the first portions, along the center line of the land. The pit pattern thus formed in a track is opposite in polarity to the pit pattern formed in the next track, and hence a mark for indicating which of right and left first portions is first irradiated with the light spot, is formed along the center line between adjacent guide grooves so that the mark is different in optical characteristic from the guide groove. Various kinds of pit patterns capable of detecting the true deviation of the light spot from a track center will be explained later in detail.

An optical disc apparatus according to the present invention uses a record carrier which has a guide groove and the above-mentioned pit patterns formed at intervals along the guide groove, and includes means for detecting the first tracking error signal based upon the diffracted light from the guide groove and means for detecting the second tracking error signal from the pit patterns which are formed at intervals along the guide groove, to form a tracking servo-system using the first and second tracking error signals, thereby correcting the track offset caused by the tilting of the record carrier or the movement of a light spot. Thus, the optical disc apparatus can record, reproduce and erase information in and from a land sandwiched between adjacent guide grooves, while performing a stable, accurate tracking operation.

Further, in order to attain the second object, according to the present invention, there is provided a master disc cutting apparatus for forming the master disc of a record carrier according to the present invention, in which a laser beam for forming header pits and another laser beam for forming the guide groove are simultaneously incident on a focusing lens, and are modulated independently of each other. The first portion of the pit pattern for detecting the true deviation of a light spot from a track has the same center line as that of the guide groove, and hence can be formed only by modulating the intensity of the laser beam for forming the guide groove. Further, the second portion of the above pit pattern is disposed along the center line of a land sandwiched between adjacent guide grooves (that is, the center line of a track), and hence can be formed only by modulating the intensity of the laser beam for forming header pits. Accordingly, the above pit pattern can be formed in a master disc without wobbling the laser beams, at the same time as the guide groove and the header pits are formed in the master disc. Thus, a record carrier which has a guide groove, header pits and a pit pattern for detecting the deviation of a light spot from a track, in accordance with the present invention, can be mass produced from the above master disc through the well-known replication technique.

BRIEF DESCRIPTION OF THE DRAWINGS

FIG. 1a is a perspective view showing a portion of a recording layer of the record carrier, and FIG. 1b is a plan view showing a positional relation among a guide groove, a header pit and a data pit which are formed in the record carrier.

FIGS. 4a to 6d are plan views showing examples of a pit pattern which is previously formed in a record carrier according to the present invention without being wobbled, to detect the deviation of a light spot from a track, FIGS. 4a to 4d show a case where the first portion of the pit pattern is formed along the center line of the guide groove so that the first portions in adjacent guide grooves do not overlap each other when viewed in a direction perpendicular to the guide grooves, FIGS. 6a to 6d show a case where the first portion of the pit pattern is formed in a region where the guide groove is interrupted, in such a manner that the first portion is connected with the guide groove.

FIGS. 8a and 8b are time charts showing examples of the operation of the embodiment of FIG. 7.

FIGS. 9a and 9b are time charts showing other examples of the operation of the embodiment of FIG. 7.

DESCRIPTION OF THE PREFERRED EMBODIMENTS

The present invention will be explained below in detail, on the basis of embodiments thereof.

Figure 1A:
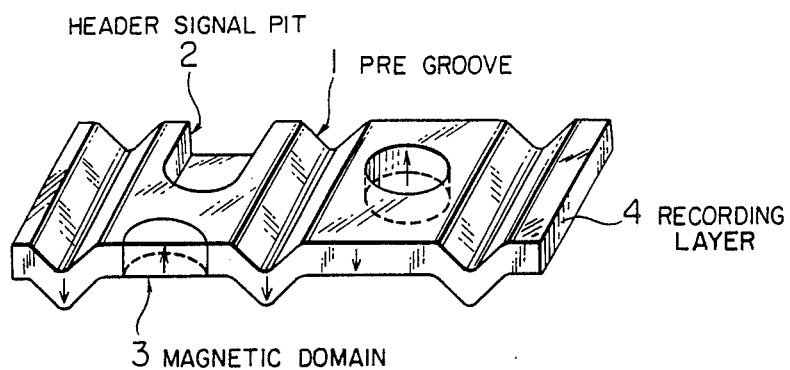
FIGS. 1a and 1b show the structure of a record carrier.
Figure 1B:
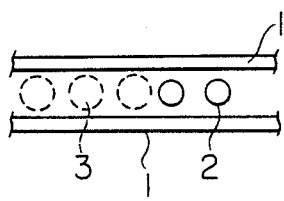

FIGS. 1a and 1b show an example of a record carrier, to which the present invention is applied, FIG. 1a is an larged perspective view showing the recording layer of the record carrier, and FIG. 1b is a plan view showing the positional relation among a guide groove, a header pit and a data pit which are formed in the record carrier. A recording layer 4 shown in FIG. 1a is formed on a disc-shaped transparent substrate, and is coated with a protective film, if necessary. Light impinges upon the recording layer 4 through the transparent substrate. Now, let us consider a magneto-optical disc, by way of example. This disc is provided with a recording layer which has a thickness of about 1000 Å and is mainly made of a Tb-Fe alloy to form a perpendicular magnetization film. Information is recorded in this recording layer in the form of a combination of upward magnetization and downward magnetization. A guide groove 1 is previously formed in the recording layer 4 spirally or concentrically so that the pitch of the guide groove is equal to, for example, 1.6 μm. The cross section of the guide groove 1 has a substantially triangular form, and the optical depth of the groove 1 is nearly equal to $\lambda/8$ (where λ indicates the wavelength of a reproducing laser beam). The exposed surface of the guide groove 1 is higher in surface noise level than a land sandwiched between adjacent grooves, and hence information is recorded in the land in the form of a magnetic domain 3. One revolution of the guide groove 1 is divided into a plurality of sectors, if necessary, and each sector is previously provided with a sector mark for indicating the head of the sector, address information including a track number and a sector number for identifying the sector, and synchronizing information, if necessary. Such a header signal is formed in the land sandwiched between guide grooves in the form of phase pits (namely, pits with a phase structure) 2 as shown in FIG. 1b, since the land is traced with a light spot. The optical depth of the pits 2 is nearly equal to one-fourth of the wavelength of the reproducing laser beam. A magneto-optical disc, in which the header pits are previously formed in a land sandwiched between adjacent guide grooves, is proposed in U.S. application Ser. No. 685,123.

In a case where each of tracks whose pitch is equal to 1.6 μm, is traced with a light spot having a diameter of about 1.8 μm, the light spot is incident upon adjacent guide grooves, and thus the interference pattern between the diffracted light of zeroth order and the diffracted light of first order appears on a photodetector having two sensors. When the light spot is accurately located on the track, the interference pattern is symmetrical with respect to the track. When the center of the light spot deviates from the center line of the track, the interference pattern becomes asymmetric, and thus the difference between the outputs of two sensors of the photodetector is not equal to zero. The above difference corresponds to the deviation of the light spot from the track. Such a tracking-error detecting method is called a push-pull method. In the above detecting method, the interference pattern on the photodetector is moved by the tilting of the record carrier or the movement of the light spot. Thus, an offset is generated between the outputs of two sensors and gives rise to an error.

The main frequency component of the tilting of the record carrier and the movement of the light spot, each of which causes the above offset, is the rotational frequency of the record carrier. Accordingly, an errorless, tracking-error signal for correcting the above offset has to be detected at a frequency twice or more higher than the rotational frequency of the record carrier. However, the detected signal is used as a control signal in a tracking operation, and a time lag is inevitably generated in such an operation. Accordingly, it is necessary to make the sampling frequency of the errorless, tracking-error signal five times or more higher than the rotational frequency of the record carrier. That is, five or more portions each for detecting the errorless, tracking-error signal have to be provided on one track (corresponding to the circumference of the record carrier) at regular intervals.

A header field is suited for such portions. Now, explanation be made of a case where pit pattern for generating an errorless, tracking-error signal is formed in the header field. However, the above pit pattern may be formed at any position, provided that the advantage of the present invention is obtained.

Figure 2:
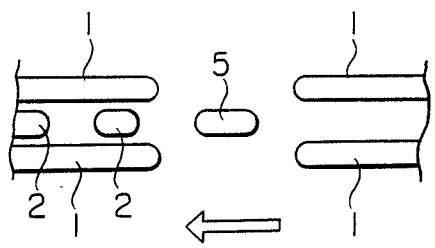
FIG. 2 is a plan view showing an example of a pit pattern which is previously formed in a record carrier according to the present invention, to detect the deviation of a light spot from a track.

FIG. 2 shows an embodiment of a record carrier, in which pit patterns for detecting an errorless, tracking-error signal are formed at intervals along a track. In more detail, FIG. 2 shows part of a header field of the embodiment. Referring to FIG. 2, adjacent guide grooves 1 are interrupted at corresponding portions, and a pit 5 for detecting the deviation of a light spot from a track by the heterodyne detection method is formed between the portions where the guide grooves 1 are interrupted, so that the center line of the pit 5 is placed on the center line between the above portions. Like the header pit 2, the pit 5 has a phase structure. The edge of the pit 5 is spaced apart from the edge of the interrupted guide groove 1 so that a diffraction pattern obtained when a light spot reaches the edge of the pit 5, is not affected by the edge of the interrupted guide groove 1. Incidentally, an optical disc (that is, the record carrier) is moved in the direction as indicated with an arrow. In other words, the light spot moves along the center line between adjacent guide grooves, from left to right. The same movement as mentioned above will be made in the following embodiments. In the present embodiment, the pit 5 is formed at the end of the header field. However, the pit 5 may be formed at the head or in the middle of the header field.

Figure 3A:
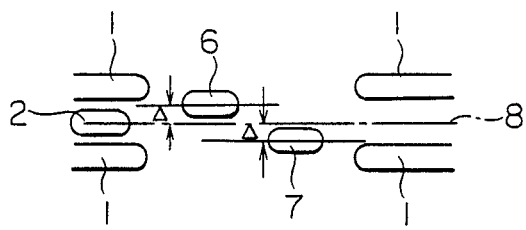
FIGS. 3a, 3b and 3c are plan views showing examples of a pit pattern which is previously formed in a record carrier according to the present invention in a wobbling manner, to detect the deviation of a light spot from a track.
Figure 3B:
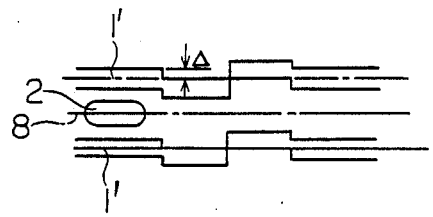
Figure 3C:
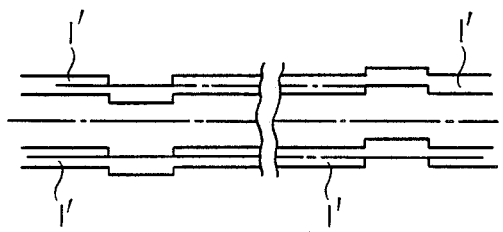

FIGS. 3a to 3c show other embodiments of a record carrier according to the present invention. In the embodiment of FIG. 3a, pits 6 and 7 having the same shape are formed on both sides of a center line 8 between adjacent guide grooves 1 in such a manner that the center line of each of the pits 6 and 7 is spaced apart from the center line 8 by an amout Δ in a radial direction, and the pits 6 and 7 do not overlap each other when viewed in the radial direction (that is, a direction perpendicular to a direction, in which information is recorded and reproduced). It is preferable that the optical depth of each of the pits 6 and 7 is made equal to that of the header pit 2 (namely, λ/4). In FIG. 3a, a mirror-like surface may be arranged between the pits 6 and 7. According to the present embodiment, the errorless, tracking-error signal can be detected by the wobbling detection method using the pits 6 and 7. In order to prevent the above signal from being affected by the guide groove 1, the guide groove is interrupted at regular intervals, and the pits 6 and 7 are formed between portions where adjacent guide grooves are interrupted. Further, it is preferable to set the positional relation between the pits 6 and 7 and the edges of the interrupted guide grooves so that when a light spot reaches or leaves the edge of each of the pits 6 and 7, the above signal is not affected by the guide grooves. However, in a case when only a continuous guide groove can be formed by a groove cutting apparatus, a guide groove which is not interrupted, may be used. Further, it is preferable to separate the pits 6 and 7 from each other when viewed in a radial direction so that when the light spot lies on at least a portion of one of the pits 6 and 7, the other pit is not irradiated with the light spot. Further, it is preferable from the standpoint of signal-to-noise ratio to make the amount Δ nearly equal to one fourth of the track pitch. In the embodiment of FIG. 3b, a pre-wobbled pattern is used. That is, adjacent guide grooves 1' are pre-wobbled at a position corresponding to part of the head field (for example, a gap portion) by a little amount Δ, and thus a land sandwiched between adjacent guide grooves is, in effect, prewobbled. In the embodiment of FIG. 3c, adjacent guide grooves 1 are wobbled at a place corresponding to a header field in one of upward and downward directions and are wobbled at another place corresponding to the next header field in the other direction, to detect the deviation of a light spot from a track by using signals which are obtained at the two places.

Figure 4A:
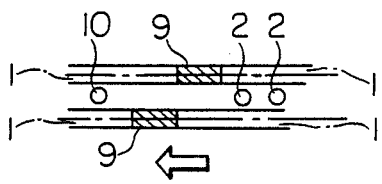
Figure 4B:
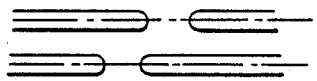
Figure 4C:
Figure 4D:
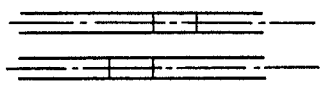

In the embodiments of FIGS. 3a to 3c, a light beam has to be wobbled when the pits 6 and 7 or the guide groove 1' is formed by the light beam. In the following embodiments, an errorless, tracking-error detecting signal can be detected from a pit pattern which is not wobbled. First, the embodiment of FIG. 4a will be explained below. Referring to FIG. 4a, a portion 9 different in optical characteristic from the guide groove 1 is provided in the guide groove 1 at positions arranged at regular intervals in such a manner that the center line of the portion 9 agrees with that of the guide groove 1 and the portions 9 of adjacent guide grooves 1 do not overlap each other when viewed in a radial direction, that is, in a direction perpendicular to a direction in which information is recorded and reproduced. Thus, when the light spot tracing the center line between adjacent guide grooves passes through the above portions 9, the light quantity from the track varies as if each of the guide grooves were wobbled. Further, a mark 10 for indicating which of right and left guide grooves is first irradiated with the light spot, is previously formed between adjacent guide grooves so as to exist in front of the above portions 9. The mark 10 may be expressed by whether a specified pit is present or not, or may be expressed by the length of a specified pit in a circumferential direction. The portion 9 different in optical characteristic from the guide groove 1 may be a mirror-like surface portion which is obtained by interrupting the guide groove 1 (as shown in FIG. 4b). Further, as shown in FIG. 4c, the portion 9 may be a thick (or thin) portion which is obtained by increasing (or decreasing) the intensity of a light beam for forming the guide groove 1. Alternatively, the depth of the guide groove 1 may be made large or small at the portion 9, as shown in FIG. 4d. Incidentally, in FIGS. 4a to 4d, an optical disc (that is, a record carrier) is moved in a direction as indicated with an arrow.

Figure 5A:
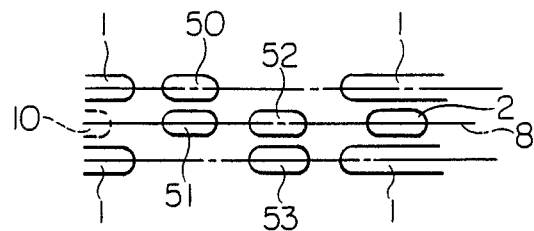
FIGS. 5a to 5d show a case where, in addition to the first portions formed along the center line of the guide groove, the second portion of the pit pattern is formed in a region sandwiched between the first portions provided in adjacent guide grooves, along the center line of the above region.

In the embodiments of FIGS. 4a to 4d, the effective wobbling quantity of the guide groove is equal to half of the track pitch, and hence the detection sensitivity for detecting the deviation of the light spot from a track is low. This problem can be solved by an embodiment shown in FIG. 5a. Referring to FIG. 5a, the guide grooves 1 is interrupted at intervals, and four pits 50 to 53 are formed in a region defined by the interrupted portions of a pair of adjacent guide grooves in such a manner that the first pits 50 and 53 are disposed on the center lines of the adjacent guide grooves 1, the second pits 51 and 52 are disposed on the center line between the adjacent guide grooves 1, the pits 50 and 51 overlap each other when viewed in a radial direction, and the pits 52 and 53 overlap each other when viewed in another radial direction. Then, a change in reflected light quantity caused by the pits 50 and 51 becomes large and maximum when the center of a light spot is placed between the guide groove 1, and the center line 8 between the adjacent guide grooves. Accordingly, the detection sensitivity for detecting the deviation of the light spot from a track is greatly improved. Further, in the embodiments of FIGS. 4c and 4d, the second pit may be formed on the center line 8 between adjacent guide grooves so that the combination of the portions 9 and the second pit makes the effective wobbling quantity optimum.

Figure 5B:
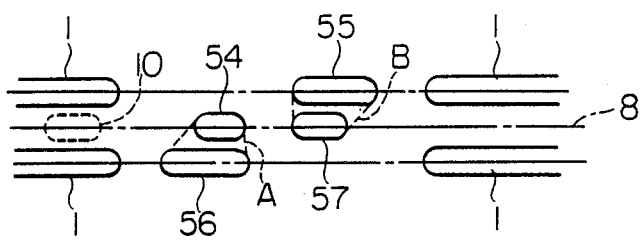

In an embodiment shown in FIG. 5b, the first pit 56 is formed on the center line of one of adjacent guide grooves and the second pit 54 is formed on the center line 8 between adjacent guide grooves so that a triangular or trapezoidal shape is defined by the pits 54 and 56 and is asymmetric with respect to the center line 8. Further, a similar shape is defined by the first pit 55 and the second pit 57. At this time, the first pits 55 and 56 are located so that the pits 55 and 56 do not overlap each other when viewed in a radial direction. Then, the deviation of the locus of the center of a light spot on a track from the center line 8 can be detected by comparing a signal waveform obtained at a time the light spot passes through a pit group A (formed of the pits 54 and 56) with a signal waveform obtained at a time the light spot passes through a pit group B (formed of the pits 55 and 57). That is, the above deviation can be detected by comparing those amplitudes of two signals obtained from the pit groups A and B which are appropriately sampled, with each other, or by comparing the width of a pulse obtained by slicing one of the above signals at a signal level with the width of another pulse obtained by slicing the other signal at the above signal level.

Figure 5C:
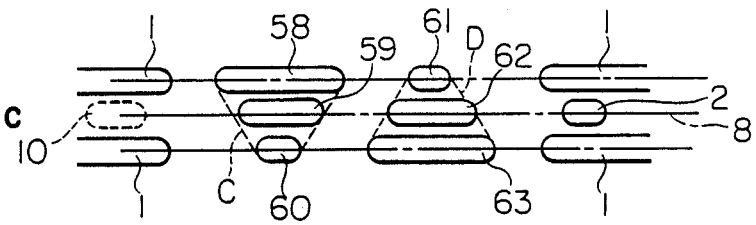

An embodiment shown in FIG. 5c is based upon the same thought as in the embodiment of FIG. 5b. Referring to FIG. 5c, a triangular or trapezoidal shape is formed by a pit group C including pits 58, 59 and 60, and a similar triangular or trapezoidal shape is formed by a pit group D including pits 61, 62 and 63 but is opposite in direction to the triangular or trapezoidal shape formed by the pit group C. Like the embodiment of FIG. 5b, a tracking error signal can be obtained by comparing signal waveforms obtained from the pit groups C and D with each other. Incidentally, the pits 60 and 61 may be omitted from the embodiment of FIG. 5c.

Figure 5D:
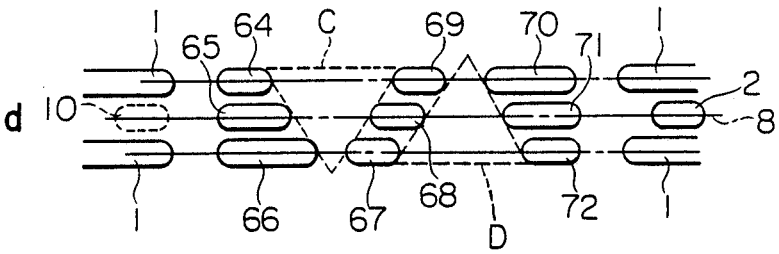

An embodiment shown in FIG. 5d has signal varying regions which correspond to the reversed versions of the signal varying regions included in the embodiment of FIG. 5c. In other words, a triangular region defined by the edges of pits 64 to 69 acts as the pit group C of FIG. 5c, and a triangular region defined by the edges of pits 67 to 72 acts as the pit group D of FIG. 5c.

In the embodiments of FIGS. 5a to 5d, adjacent guide grooves are made discontinuous in the tracking error detecting region. However, in order to avoid a problem which arises in some tracking error detecting methods, that is, a problem that discontinuous portions of the guide groove operates as an external disturbance for a tracking error signal, the guide groove may be made continuous. The optical depth of a pit pattern for detecting the deviation of the light spot from a track, is made equal to λ/4, by way of example. Then, the pit pattern can be optically distinguished from the guide groove.

In the foregoing embodiments, explanation has been made only on a pair of adjacent guide grooves and a land formed therebetween. However, a pair of adjacent lands have a guide groove in common, and different pit patterns appear at guide grooves on both sides of a land. Accordingly, pit patterns in adjacent guide grooves and lands will be explained below. Pit patterns are formed so as to be symmetrical with respect to the center line of the guide groove. Then, the pit pattern on one of adjacent lands will be a reversed version of the pit pattern on the other land. In order to determine the polarity of a detected tracking error, it is necessary to know how a pit pattern is arranged on a land which is now traced with a light spot. For this reason, the mark 10 for indicating the arrangement of a pit pattern is formed on the center line of a land so as to be placed in front of the pit pattern.

Figure 6A:
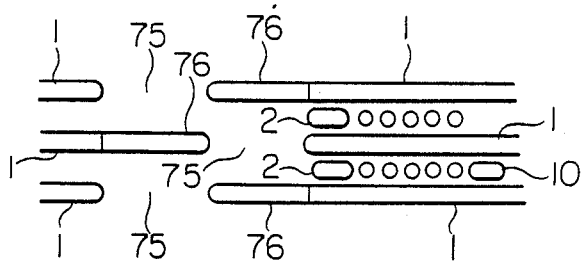
Figure 6B:
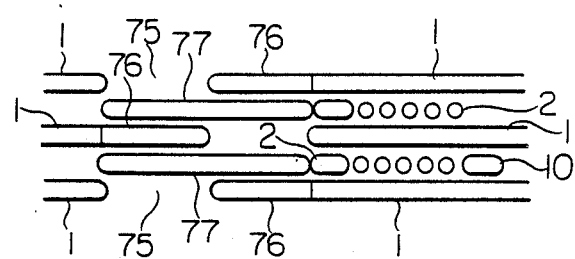
Figure 6C:
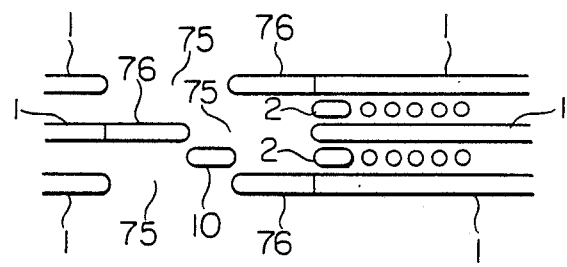
Figure 6D:
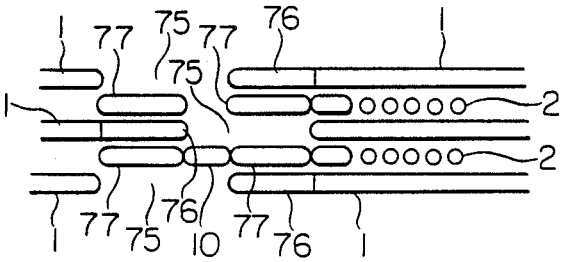

FIGS. 6a to 6d show further embodiments of a record carrier, in which a pit pattern for detecting an errorless, tracking-error is discretely formed. In these embodiments, a guide groove is interrupted at each header field so that the interrupted portion forms a mirror-like surface portion 75, and the portions 75 at adjacent guide grooves do not overlap each other when viewed in a radial direction. That portion 76 of one of adjacent guide grooves which confronts the mirror-like surface portion 75 at the other guide groove, is the first phase pit having a depth of $\lambda/4$, to enhance the signal level of a signal obtained from the pit pattern and the detection sensitivity for detecting the deviation of the light spot from a track. Further, the second phase pit 77 which has the form of a strip and is called a center pit, may be formed in a land portion which exists between a pair of first phase pits 76. The embodiments of FIGS. 6a and 6c do not include the center pit 77, but the embodiments of FIGS. 6b and 6d include the center pit 77, which has a depth d (where $0 < d \leq \lambda/4$). In these embodiments, adjacent tracks are different in the arrangement of a pit pattern from each other, and are opposite in polarity of tracking-error signal to each other. In order to cope with the above difficulties, a polarity marker 10 which has a depth of $\lambda/4$ to obtain a maximum modulation degree, is formed on every other track. The polarity marker 10 may be disposed in a gap field which exists between the header field and the recording field, as shown in FIGS. 6a and 6b, or may be disposed in the pit pattern, as shown in FIGS. 6c and 6d. In both cases, the same effect is obtained. The embodiments of FIGS. 6c and 6d are made smaller in the length of the first phase pit 76 than the embodiments of FIGS. 6a and 6b, to provide the polarity marker 10 in a central region between adjacent first phase pits 76. The pit patterns shown in FIGS. 5a to 5d and 6a to 6d correspond to the pre-wobbling detection method using a wobbling distance $\Delta$ equal to p/2 (where p indicates a track pitch). In the pre-wobbling detection method, when the wobbling distance $\Delta$ is made equal to p/4, the detection sensitivity for detecting the deviation of the light spot from a track becomes maximum. However, in order to deviate a pit from a predetermined position by a distance of p/4, it is necessary to apply two signals having different frequencies to an acousto-optical modulator/deflector asynchronously, thereby deflecting a light beam. Accordingly, a cutting apparatus for forming such a pit pattern becomes complicated in structure. In a case where information is recorded in a land formed between adjacent guide grooves, the center line of a pre-wobbled pit pattern is considered to be the center line of a track, and hence it is necessary to accurately locate the center line of the pre-wobbled pit pattern in relation to the center line of the guide groove. The pit patterns shown in FIGS. 5a to 5d and 6a to 6d are a little inferior in sensitivity for detecting the deviation of the light spot from a track to the pre-wobbled pit pattern, but can be formed only by modulating the intensity of a laser beam by an acousto-optical modulator. Further, the center line of the guide groove can be detected from each of these pit patterns. Accordingly, even when a header field provided on a land, a little deviates from the center line of a track, information can be recorded on the center line of the track.

Next, explanation will be made of a master disc cutting apparatus for fabricating the master disc of a record carrier according to the present invention.

Figure 7:
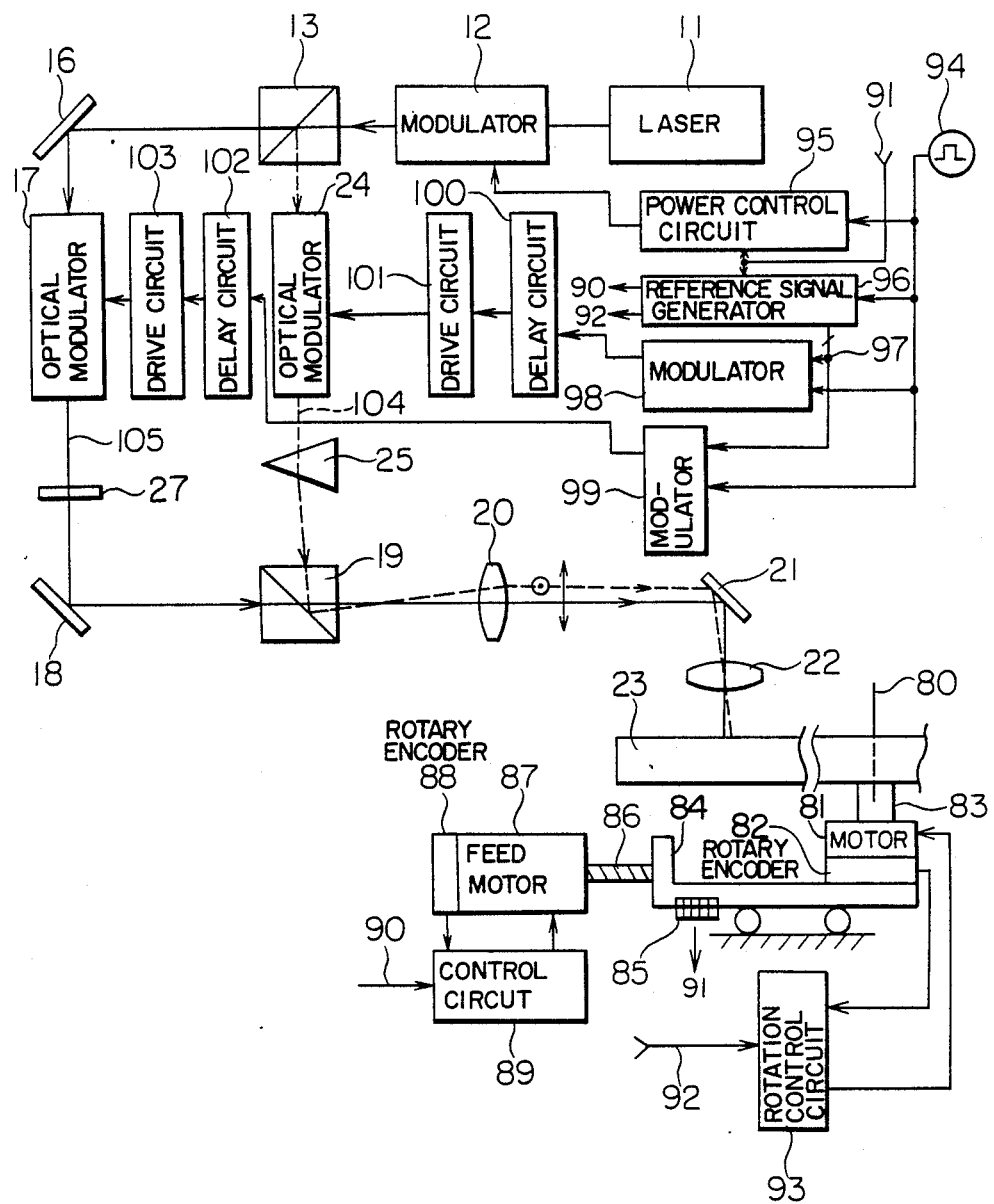
FIG. 7 is a block diagram showing an embodiment of a master disc cutting apparatus according to the present invention.

FIG. 7 shows an embodiment of a master disc cutting apparatus according to the present invention. Referring to FIG. 7, a linearly-polarized laser beam emitted from an argon laser 11 impinges upon a modulator 12, in which the intensity of the laser beam is modulated so as to be proportional to a radius between a laser beam receiving point on a glass disc 23 coated with a photo-resist layer and the center axis of the glass disc 23. The laser beam from the modulator 12 is divided by a beam splitter 13 into two parts, one of which is converted by an optical modulator 17 into a pulsive laser beam in accordance with a header pit forming signal, and then the plane of polarization is rotated by a halfwave plate 27 through 90°. The linearly-polarized laser beam from the halfwave plate 27 has the plane of polarization parallel to the paper of FIG. 7, and passes through a polarization beam splitter 19. The other part from the beam splitter 13 is made intermittent by an optical modulator 24, to interrupt the guide groove 1 in a desired manner. The linearly-polarized laser beam having passed through the optical modulator 24 is reflected from the polarization beam splitter 19. Two laser beams from the polarization beam splitter 19 make a small angle therebetween. These laser beams pass through a collimator lens 20, and are then focused on the photo-resist layer of the glass disc 23 by a focusing lens 22. Incidentally, reference numerals 16, 18 and 21 designate reflecting mirrors. Let us consider a case where the track pitch is made equal to 1.6 $\mu$m and the focusing lens 22 has a numerical aperture of 0.9. In order to form the header pit 2 in a substantially central region of a land, it is necessary to make the angle between two laser beams incident upon the focusing lens 22 nearly equal to 0.02°. This angle is formed by deflecting the laser beam from the optical modulator 24 by a prism 25. When the incident angle of the laser beam from the optical modulator 17 on the focusing lens 22 and the magnification of the lens 20 are known, the apex angle of the prism 25 for obtaining the above angle between two laser beams can be determined. Thus, a stable optical path can be readily determined.

The optical construction of the present embodiment has been explained in the above. Next, the electrical construction of the embodiment will be explained. Referring again to FIG. 7, the glass disc 23 is connected to a motor 81 through a motor shaft 83, and turns on a rotating axis 80. Further, a rotary encoder 82 is mounted on the axis of the motor 81, and the output of the rotary encoder 82 is applied to a rotation control circuit 93, in which the output of the rotary encoder 82 is compared with a rotation reference signal 92, to supply a control signal to the motor 81, thereby causing the motor 81 to synchronize with the reference signal 92. The reference signal 92 will be explained later.

The glass disc 23 and the motor 81 are mounted on a movable base 84, which is connected to a feed motor 87 through a feed screw 86. Another rotary encoder 88 is mounted on the feed motor 87, and the output of the rotary encoder 88 is applied to a control circuit 89, to be compared with a feed reference signal 90. The feed motor 87 is controlled on the basis of the result of the above comparison. Although the feed reference signal 90 will be explained later, the rotation reference signal 92 and the feed reference signal 90 are set so that the pitch of guide grooves is kept constant.

A scale 85 for detecting the position of the movable base 84 is attached to the base 84, and delivers a position signal 91 which indicates the position of the scale 85. The position signal 91 is applied to a power control circuit 95 which generates a signal for controlling the power of laser beam necessary for a recording operation in accordance with a radius between the laser beam receiving point on the glass disc 23 and the center axis of the disc 23. The power control circuit 95 is also applied with a reference clock signal from an oscillator 94, and the output of the power control circuit 95 controls the modulator 12 so that the laser beam emitted from the laser 11 has an intensity suited for a recording operation. The position signal 91 is also applied to a reference signal generating circuit 96, which generates the reference signals 90 and 92 with the aid of the reference clock signal. The reference signal generating circuit 96 also generates an address signal 97 which includes a track number and a sector number, on the basis of the position signal 91 and the reference clock signal.

The address signal 97 and the reference clock signal are applied to a modulation circuit 98, which generates a signal for determining a pit pattern on the guide groove. This signal is applied through a delay circuit 100 to a drive circuit 101, which drives the optical modulator 24. Thus, a modulated, guide groove forming laser beam 104 emerges from the optical modulator 24.

The address signal 97 and the reference clock signal are also applied to another modulation circuit 99, which generates a signal for determining a pit pattern on the land formed between adjacent guide grooves. This signal is applied through another delay circuit 102 to another drive circuit 103, which drives the optical modulator 17. Thus, a modulated, land cutting laser beam 105 emerges from the optical modulator 17. The delay circuits 100 and 102 are used for matching the guide track forming laser beam 104 to the land cutting laser beam 105. In more detail, each of the optical modulators 17 and 24 may be a modulator utilizing the electro-optic effect or a modulator utilizing the acousto-optic effect. In either case, a time lag is inevitable in each optical modulator, and moreover the optical modulators 17 and 24 are different in time lag from each other. Thus, the delay circuits 100 and 102 are indispensable for matching the laser beams 104 and 105 to each other. Now, let us consider a case where a pit pattern shown in FIG. 5c is formed in a master disc and a pit pattern shown in FIG. 6b is formed in another master disc, by way of example. In order to form the pit pattern of FIG. 5c, it is necessary for the laser beams 104 and 105 to have intensity waveforms shown in FIGS. 8a and 8b. Further, in order to form the pit pattern of FIG. 6b, it is necessary for the laser beams 104 and 105 to have intensity waveforms shown in FIGS. 9a and 9b. FIGS. 8a and 8b show the waveforms before and after one revolution of the disc 23, respectively. Similarly, FIGS. 9a and 9b show waveforms before and after one revolution of the disc 23, respectively. In FIGS. 8a, 8b, 9a and 9b, reference numerals with single prime (for example, 2', 10', 58', 59', 76', 77') correspond to reference numerals with no prime in FIGS. 5c and 6b (for example, 2, 10, 58, 59, 76, 77), and a reference numeral with double prime (that is, 1'') corresponds to the reference numeral 1 in FIGS. 5c and 6b. The pulse 10' corresponding to the mark 10 appears at every other revolution. In order to wobble a pit pattern or the guide groove as shown in FIGS. 3a to 3c, it is necessary to provide an optical deflector on one of two optical paths shown in FIG. 7, or to cause the acousto-optical modulator 17 or 24 to act as an optical modulator and an optical deflector. In this case, a deflection signal is formed from the address signal 97 and the reference clock signal, and drives the above optical deflector through a delay circuit, to match the deflecting operation to the intensity modulation of the laser beam. The photo-resist layer of the disc 23 exposed to the laser beams of the cutting apparatus of FIG. 7, is subjected to developing, to remove exposed portions, thereby forming a guide groove, header pits, and pit patterns for detecting the deviation of the light spot from a track. Thus, a master disc is completed. The master disc is subjected to the processing for making a surface conductive, and then electroforming with nickel, to form a stamper. A large number of disc-shaped substrates each having the above-mentioned guide groove, header pits and pit patterns can be fabricated from the stamper through replication techniques. Each substrate is coated with an appropriate recording layer in accordance with a recording method, to form a record carrier.

Figure 10:
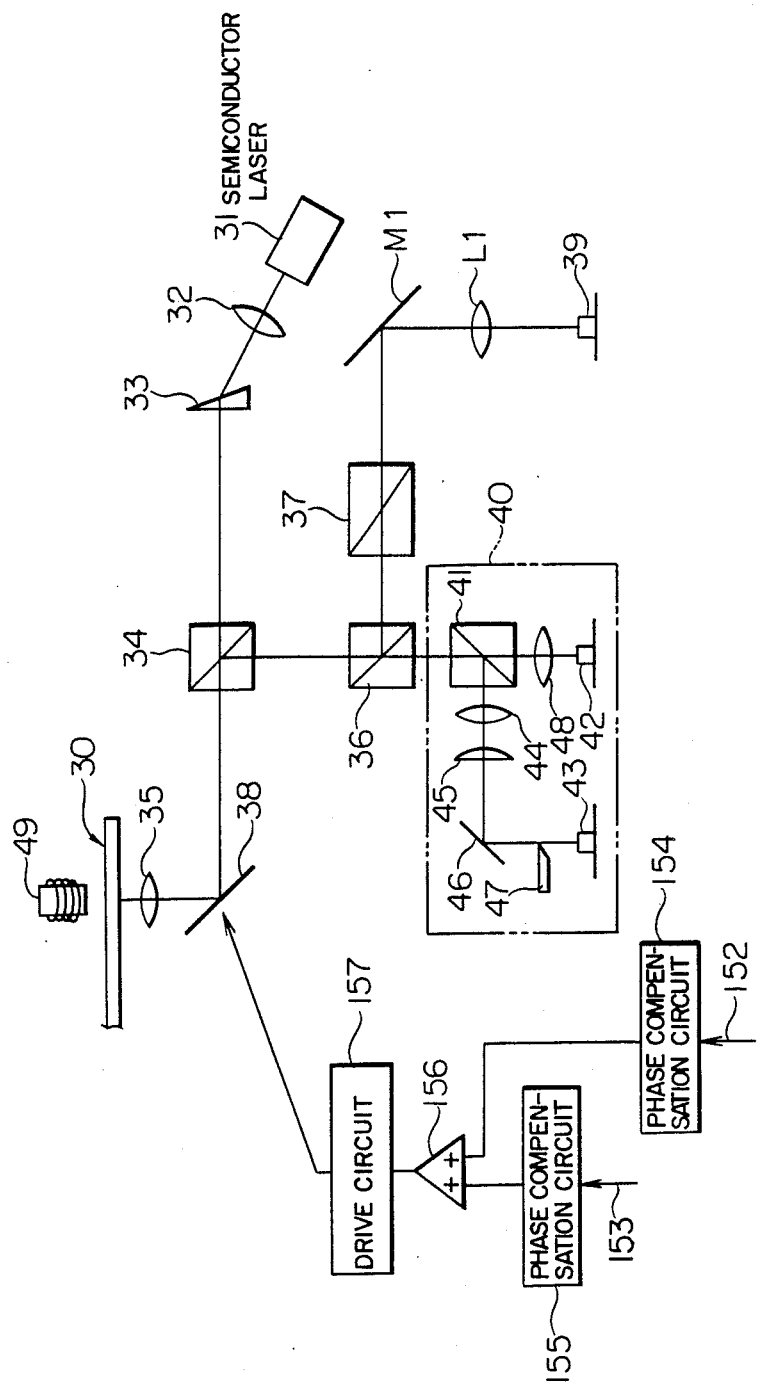
FIG. 10 is a schematic diagram showing an embodiment of an optical disc apparatus according to the present invention.

FIG. 10 shows an embodiment of an optical disc apparatus for performing recording, reproducing and erasing operations for a magneto-optical disc (that is, a record carrier) according to the present invention. Referring to FIG. 10, a laser beam emitted from a semiconductor laser 31 impinges upon a collimator lens 32, and thus a laser beam formed of parallel light rays emerges from the lens 32. The laser beam from the lens 32 is deflected by a triangular prism 33 so as to have a circular cross section, passes through a beam splitter 34, and then impinges on a mirror 38. The laser beam reflected from the mirror 38 is focused on the recording layer of a disc 30 by a lens 35. An electromagnetic coil 49 for generating a magnetic field necessary for recording and erasing operations is disposed so that the disc 30 is interposed between the lens 35 and the coil 49. The laser beam reflected back from the disc 30 is reflected from the beam splitter 34, and then impinges on a beam splitter 36. The laser beam reflected from the beam splitter 36 passes through an analyzer 37, and is then reflected from a mirror M1. The laser beam from the mirror M1 impinges on a photodetector 39 through a lens L1, and thus magnetization information and a header signal can be detected. While, the laser beam having passed through the beam splitter 36 is led into an optical system 40 for obtaining control signals which are necessary for automatic focusing and tracking control. For example, the laser beam from the beam splitter 36 is divided by a beam splitter 41 into two parts, one of which passes through a lens 48 and then impinges upon a photodetector 42 having a pair of sensors for detecting the deviation of the light spot from a track, and the other part passes through an automatic optical system formed of a spherical lens 44 and a cylindrical lens 45, and is then reflected from a mirror 46. The laser beam from the mirror 46 is partially interrupted by a knife edge 47, and then impinges on a photodetector 43 for detecting the out of focus. An out-of-focus detecting system is disclosed in U.S. Pat. No. 4,450,547. The above-mentioned optical parts make up an optical head, and the whole or part of the optical head can move in a radial direction of the disc 30. Many methods for detecting the out of focus have been proposed, and all of the methods are applicable to a disc (namely, record carrier) according to the present invention.

Now, explanation will be made on how to obtain a tracking-error signal which is independent of the tilting of the disc or the movement of the light spot, from the pit patterns used in the embodiments of a record carrier according to the present invention.

Figure 11:
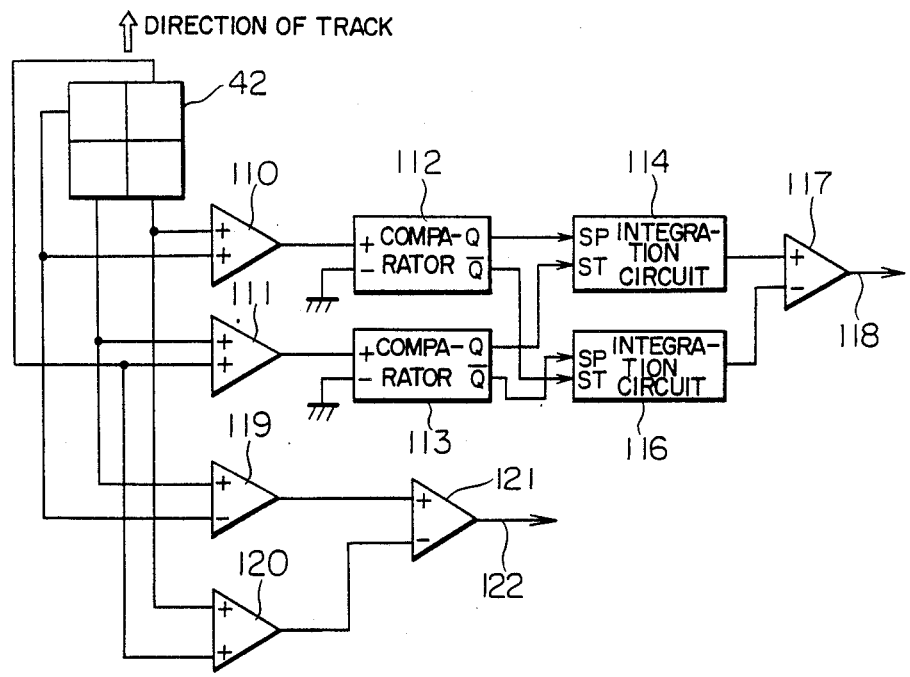
FIGS. 11 and 12 are block diagrams showing examples of a tracking-error detecting circuit used for a record carrier according to the present invention.

For the embodiment of FIG. 2, the pit 5 is detected by the heterodyne method. The detection method is described in detail in Japanese patent application Unexamined Publication No. 58-203636, and hence only that part of the method which is concerned with the present invention, will be explained below. The photodetector 42 has four sensors, which are arranged with respect to the direction of a track, as shown in FIG. 11. The outputs of two sensors on a diagonal are applied to an adder 110 to obtain the sum of the above outputs. Similarly, the sum of the outputs of two sensors on another diagonal is obtained by an adder 111. The outputs of the adders 110 and 111 are applied to comparators 112 and 113, respectively, to be digitized. The outputs of the comparators 112 and 113 are applied to integration circuits 114 and 116. In each integration circuit, when an input is applied to an ST terminal, the integrating operation is started with a predetermined time constant. When an input is applied to an SP terminal, the above integrating operation is stopped, and an integrated value is held. Thus, the integration circuits 114 and 116 deliver an analog quantity proportional to a difference in starting or terminating time of output between the comparators 112 and 113. The difference between the outputs of the integration circuits 114 and 116 is obtained by a difference circuit 117, and is used as a tracking error signal 118, which is intermittently obtained.

Further, the sum of the outputs of a pair of sensors symmetrical with respect to the direction of the track is obtained by an adder 119, and the sum of the outputs of another pair of sensors symmetrical with respect to the direction of the track is obtained by an adder 120. The outputs of the adders 119 and 120 are applied to a differential amplifier 121, the output of which is used as a tracking error signal 122 based upon diffracted light.

Figure 12:
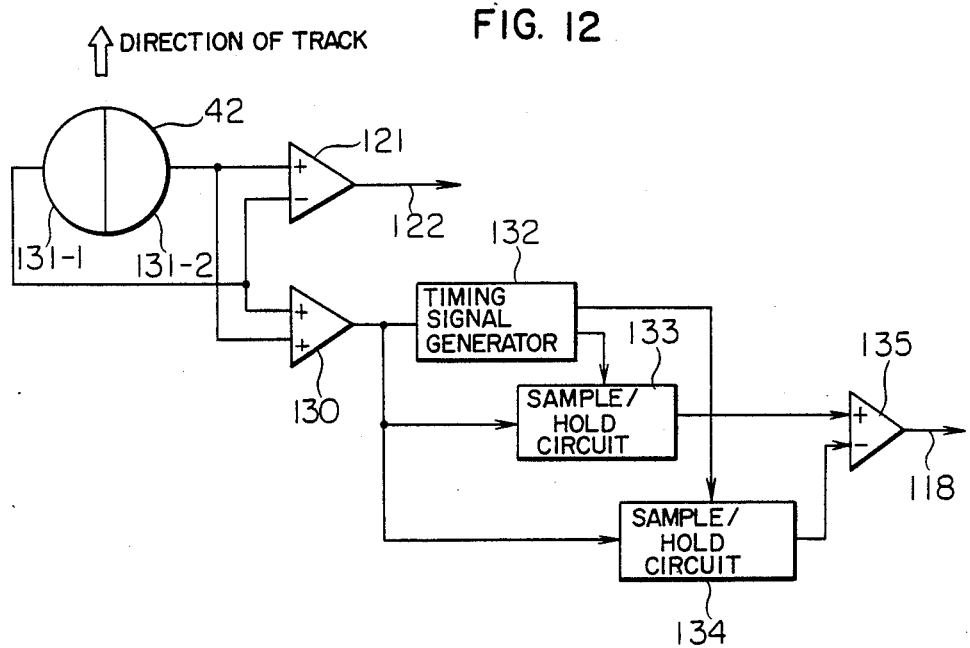

Next, explanation will be made on a case where a tracking error signal is obtained from the prewobbled pit pattern shown in FIG. 3a or the prewobbled guide grooves shown in FIG. 3b. In this case, the photodetector 42, as shown in FIG. 12, has a pair of sensors 131-1 and 131-2, which are arranged symmetrically with respect to the direction of a track. The sum of the outputs of the sensors 131-1 and 131-2 is obtained by an adder 130, and is applied to a timing signal generation circuit 132 and sample/hold circuits 133 and 134. In the timing signal generation circuit 132, a synchronizing pit in the header field is detected, and the synchronizing signal thus obtained is used for forming a timing signal necessary for obtaining a signal from the wobbled pits 6 and 7. The above timing signal is applied to the sample/hold circuits 133 and 134, and the outputs of these circuits are applied to a differential amplifier 135, the output of which is used as the tracking error signal 118.

The above synchronizing pit may be replaced by the sector mark disclosed in Japanese patent application Unexamined Publication No. 58-169337, or the SYNC mark disclosed in Japanese patent application Unexamined Publication No. 58-169341. Further, an elongate hole used in a compact disc may be substituted for the synchronizing pit.

In a case where the wobbled guide grooves of FIG. 3c is used, it is necessary that the timing signal (namely, sampling signal) from the timing signal generation circuit 132 is not completed in one sector but continues for a period corresponding to two sectors, to control one of the sample/hold circuits 133 and 134 when the light spot passed through each of two sectors.

In the pit patterns shown in FIGS. 4a to 4d and 5a, the polarity of effective wobbling is reversed at intervals of one sector, and hence the polarization mark 10 is provided on a land. Accordingly, when the mark 10 is detected by the timing signal generation circuit 132, sampling pulses applied to the sample/hold circuits 133 and 134 are exchanged. Thus, a stable, tracking error signal is obtained from two continuous sectors.

In a case where the pit patterns shown in FIGS. 5b to 5d are used, the sample/hold circuits 133 and 134 are controlled so that signal levels corresponding to respective center portions of the pit groups A and B or signal levels corresponding to respective center portions of the pit groups C and D are delivered from the circuits 133 and 134.

Figure 13:
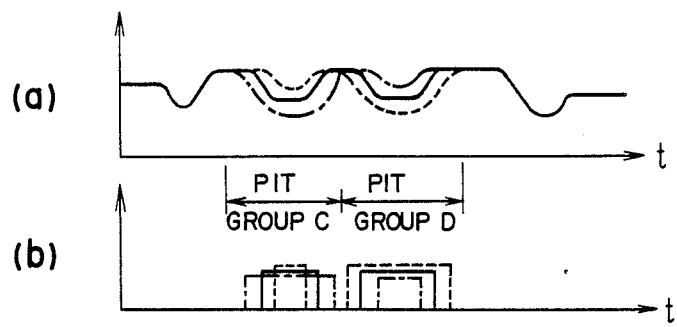
FIG. 13, consisting of (a) and (b), is waveform chart showing waveforms which are obtained by the circuit of FIG. 12.

Further, the following waveform processing method may be used. Now, let us consider a case where a light spot moves in the direction of a track and passes through the pit pattern shown in FIG. 5c. When the light spot deviates upwardly or downwardly from the center line 8 between adjacent guide grooves, signal waveforms shown in FIG. 13 are obtained. That is, when the light spot moves on the center line 8, a signal waveform is obtained which is indicated by a solid line in FIG. 13. When the light spot deviates upwardly from the center line 8, a signal waveform is obtained which is indicated by a dot-dash line in FIG. 13. When the light spot deviates downwardly from the center line 8, a signal waveform is obtained which is indicated by a broken line in FIG. 13. In other words, when the light spot deviates upwardly or downwardly from the center line 8, a time interval necessary for the light spot to pass through the pit group C differs from a time interval necessary for the light spot to pass through the pit group D. The difference between these time intervals can be detected in such a manner that waveforms shown in FIG. 13 are formed by slicing the signal waveforms of FIG. 13 at a signal level, or leading and falling edges in the signal waveforms of FIG. 13 are detected by differentiating the signal waveforms. When the difference between the above time intervals is detected on the basis of the leading and falling edges in one of the signal waveforms, the difference will not be affected by an electrical offset or a change in intensity of the light spot. The leading and falling edges in a signal waveform may be detected in such a manner that the signal waveform is caused to pass through a delay circuit, and the difference between the input and the output of the delay circuit is taken out.

Figure 14:
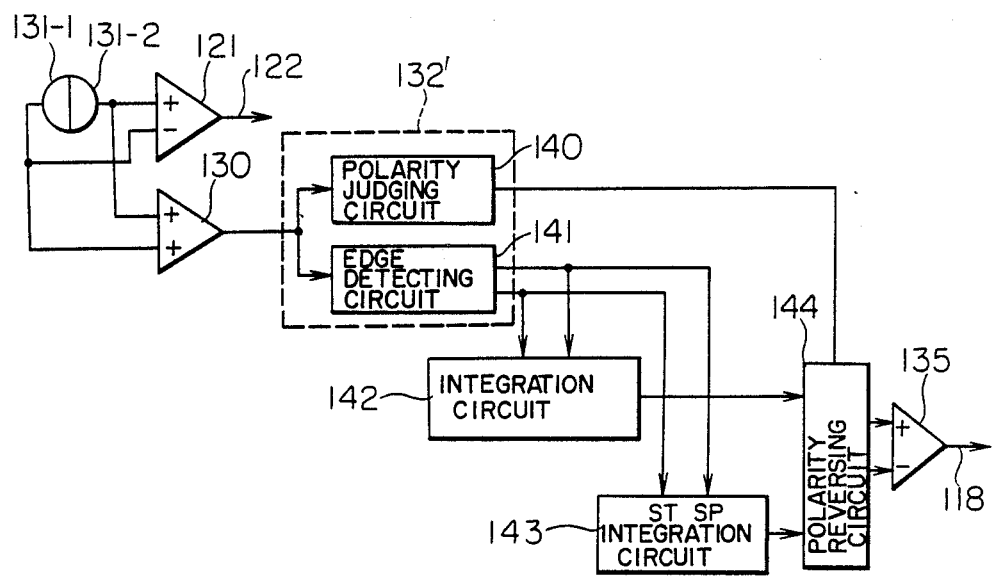
FIG. 14 is a blick diagram showing a further example of a tracking-error detecting circuit used for a record carrier according to the present invention.

The difference between the time intervals necessary for the light spot to pass through the pit groups C and D can be converted into the tracking error signal by using the integration circuits and differential amplifier such as shown in FIG. 11. In this case, the ST terminal of each integration circuit is applied with a signal which indicates a falling edge, and the SP terminal is applied with a signal which indicates a leading edge. The whole circuit configuration for obtaining the tracking error signal is shown in FIG. 14. Referring to FIG. 14, the sum of the outputs of the sensors 131-1 and 131-2 is applied to a timing signal generation circuit 132', which includes both a polarity judging circuit 140 for detecting the polarity identification mark 10 to generate a polarity reversing signal, and an edge detection circuit 141 for generating a signal which indicates the above-mentioned leading and falling edges. The edge detection circuit 141 supplies leading and falling edges corresponding to the pit group A (or C) to an integration circuit 142, and supplies leading and falling edges corresponding to the pit group B (or D) to an integration circuit 143. The outputs of the integration circuits 142 and 143 are applied to a polarity reversing circuit 144, to be polarity-inverted depending on the state of the output of the polarity judging circuit 140. Outputs from the polarity reversing circuit 144 are applied to a differential amplifier 135, the output of which is used as the tracking error signal 118.

Figure 15:
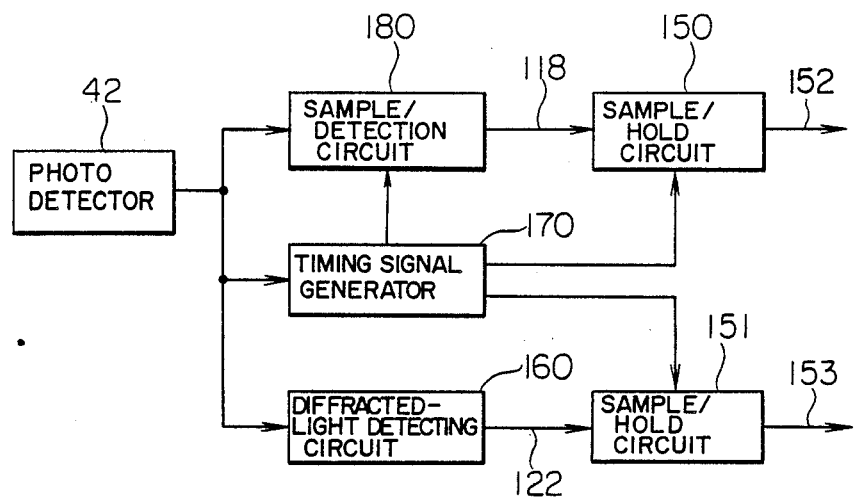
FIG. 15 is a block diagram showing the outline of a tracking-error detecting system used for a record carrier according to the present invention.

Next, explanation will be made of a control system using the tracking error signals 118 and 122 which are obtained in the above-mentioned manner. The above-mentioned, tracking-error detecting systems can be summarized as shown in FIG. 15. Referring to FIG. 15, a signal from the photodetector 42 is applied to a sample/detection circuit 180 for generating the errorless, tracking-error signal 118 in a sampling manner, a timing signal generation circuit 170, and a diffracted light detection circuit 160 for generating the tracking error signal 122 based upon diffracted light. The timing signal generation circuit 170 supplies control signals to the timing signal generation circuits 132 and 132', a sample/hold circuit 150 for sampling and holding the errorless, tracking-error signal 118, and a sample/hold circuit 151 for sampling and holding the tracking error signal 122 based upon diffracted light. As to the errorless, tracking-error signal 118, the signal 118 is sampled at a time the value of signal is established, and the sampled value is held till the next sampling time. Thus, a signal 152 is delivered from the circuit 150. For the pit pattern shown in FIG. 2, the value of the signal 118 is established at a time just after the light spot has passed through the pit 5. For the pit patterns shown in FIGS. 3a to 3c, 4a to 4d, and 5a, the value of the signal 118 is established at a time just after the light spot has passed through the pre-wobbled or effectively-wobbled pit groups. For the pit patterns shown in FIGS. 5b to 5d, the value of the signal 118 is established at a time just after the light spot has passed through the pit group B or D. As to the tracking error signal 122, the signal 122 is sampled at a time just before the guide groove is interrupted, and the sampled value of the signal 122 is held till the guide groove again appears. Thus, a signal 153 is delivered from the sample/hold circuit 151. In a case where the guide groove is continuous, it is desirable to hold a value of the signal 122 at a place which exists in front of a region where the errorless, tracking error signal 118 is detected.

Next, explanation will be made of a deflecting-mirror control system (that is, a system for controlling a tracking control actuator), by reference to FIG. 10.

Figure 16:
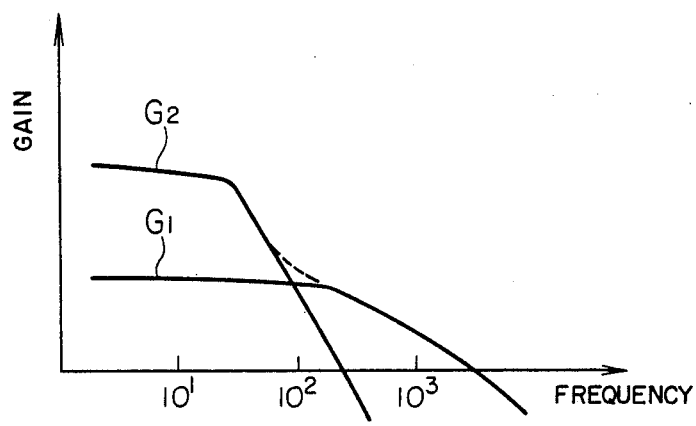
FIG. 16 is a graph showing the gain-frequency characteristic of the system of FIG. 15.

Referring to FIG. 10, an output 153 from the sample/hold circuit 151 and an output 152 from the sample/hold circuit 150 are applied to an adder 156 through phase compensation circuits 155 and 154, respectively, to combine the outputs 152 and 153. Now, let us express transfer functions on the sample/hold circuit—151 side and the sample/hold circuit—150 side by $G_1$ and $G_2$, respectively. The low-frequency gain of the transfer function $G_2$ having a low-frequency component is set so as to be 20 to 40 db higher than the gain of the transfer function $G_1$ for the tracking error signal 122 based upon diffracted light, as shown in FIG. 16. Preferably, the transfer functions $G_1$ and $G_2$ are made equal to each other at a frequency of 100 to 200 $H_z$. The tracking signal thus obtained from the adder 156 is applied to a mirror drive circuit 157, to drive the deflecting mirror 38, thereby performing a tracking operation. When the transfer characteristic shown in FIG. 16 is set, the electric offset due to the tilting of the disc, or others is corrected, and a stable tracking operation can be performed since the low-frequency gain of the detection system is made high. In the apparatus of FIG. 10, the tracking operation is performed on the basis of the deflection of the mirror 38. However, the tracking operation is not limited to such a method, but may be performed on the basis of the vibration of the objective lens 35.

Figure 17:
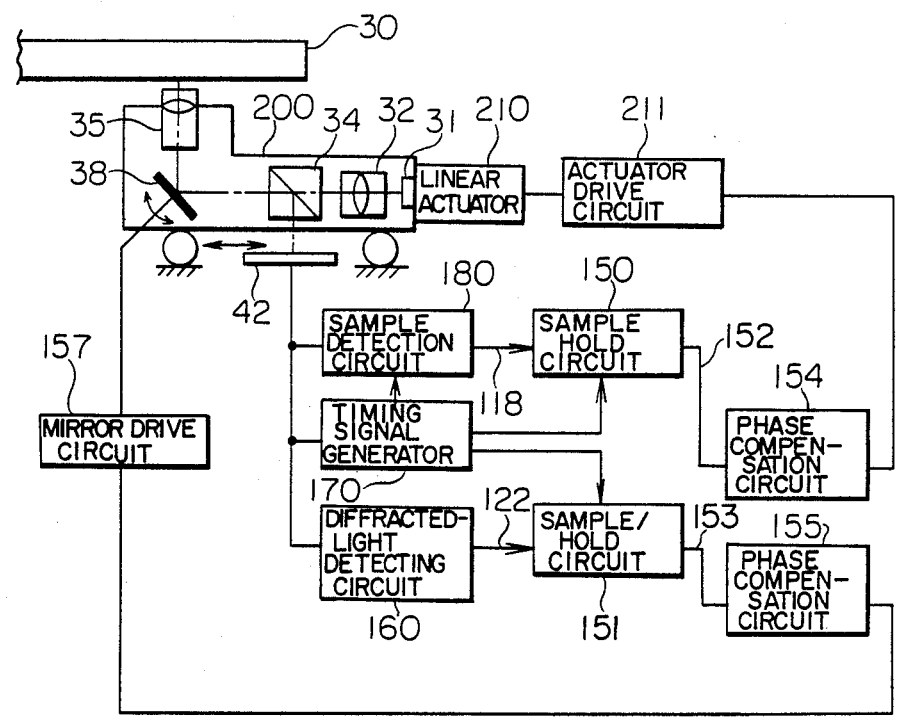
FIG. 17 is a block diagram showing another embodiment of an optical disc apparatus according to the present invention.

Next, explanation will be made of another embodiment of a recording/reproducing apparatus (that is, an optical disc apparatus) according to the present invention, by reference to FIG. 17.

The tracking operation may be performed by a two-stage servo system such as disclosed in Japanese patent application Unexamined Publication No. 58-91536 and U.S. application Ser. No. 736,165 filed on May 20, 1985, now U.S. Pat. No. 4,607,358 (which is a continuation of U.S. application Ser. No. 443,399 filed on Nov. 22, 1982). In the two-stage servo system, the whole of an optical head is moved by a coarse servo system, and the deflection of a mirror or the vibration of a lens is made by a fine servo system. The embodiment of FIG. 17 uses such a two-stage servo system. That is, a linear actuator 210 makes possible the quick access of the whole of an optical head 200 to a predetermined track in a radial direction, and the offset is corrected by the low-frequency component of the tracking signal. In FIG. 17, the same reference numerals as in FIGS. 10 and 15 designate like optical or electrical parts. Explanation of common parts in FIGS. 10, 15 and 17 will be omitted for the sake of brevity. Referring to FIG. 17, the tracking error signal 153 which is based upon diffracted light and is delivered from the sample/hold circuit 151, passes through the phase compensation circuit 155, and is then applied to the drive circuit 157, to drive the mirror 38 (or the lens 35) included in the optical head 200. The errorless, tracking-error signal 152 passes through the phase compensation circuit 154, and is then applied to a linear-actuator drive circuit 211, to drive the linear actuator 210. Thus, the two-stage servo system is formed. When the transfer function $G_1$ of a mirror (or lens) drive system and the transfer function $G_2$ of a linear actuator drive system are set as shown in FIG. 16, the low-frequency gain is high, and a stable tracking operation can be performed.

Figure 18:
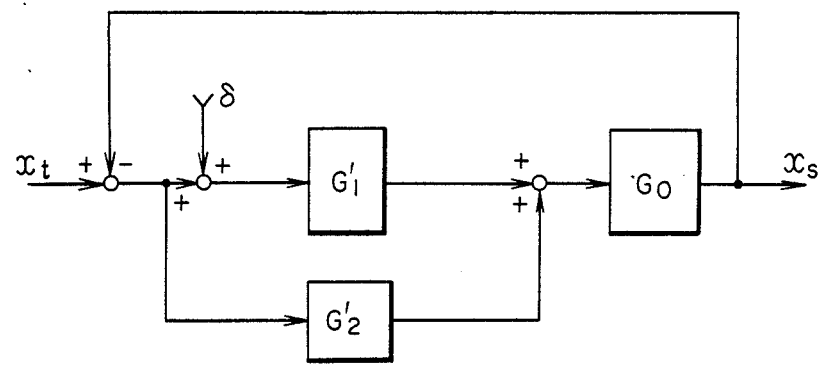
FIG. 18 is a block diagram for explaining a tracking control system.

Now, the operation of the tracking control system will be explained below, on the basis of the embodiment of FIG. 10. In this embodiment, the operation of the control system is expressed by the block diagram of FIG. 18. In FIG. 18, $G'_1$ and $G'_2$ indicate the transfer functions of electric systems for detected tracking-error signals, $G'_2$ the transfer function of an electric system for the errorless, tracking-error signal which has been sampled, and $G_0$ the transfer function of the actuator.

Accordingly, the transfer functions $G_1$ and $G_2$ in the above embodiment are given by the following equations:

$$G_1 = G'_1 \times G_0$$

$$G_2 = G'_2 \times G_0$$

When an error component (that is, a track offset) due to the tilting of the disc or others, the movement of the track, and the movement of the light spot are expressed by δ, $x_t$ and $x_s$, respectively, we can obtain the following equation:

$$\frac{x_s}{x_t} = \frac{(G_1 + G_2)}{1 + (G_1 + G_2)} + \frac{G_1}{1 + (G_1 + G_2)} \left(\frac{\delta}{x_t}\right)$$

where the first term on the right-hand side indicates the closed-loop characteristic of an ordinary control system, and the second term indicates a residue which is based upon the track offset due to the tilting of the disc or others. The second term can be made small by decreasing the value of $G_1$. However, when the value of $G_1$ is decreased, the tracking ability is lowered. Accordingly, it is necessary to make small the second term without reducing the value of $G_1$.

The quantity δ is based upon the tilting of the disc, the movement of the light spot, or others, and hence has frequency components only in a frequency range which is several times higher than the rotational frequency of the disc. Accordingly, it is necessary to make small the second term in the above frequency range. If the value of $G_2$ is less than or equal to the value of $G_1$ in this frequency range, it will be impossible to make the second term sufficiently small. In other words, the transfer function $G_2$ is required to have a frequency characteristic such as shown in FIG. 16. When the quantity $$\frac{G_1}{1 + (G_1 + G_2)}$$

is expressed by a formula $$\frac{G_1}{1 + (G_1 + G_2)} \simeq \frac{1}{G_3},$$

the quantity $G_3$ lies in an area which is enclosed with the gain-frequency curves of the transfer functions $G_1$ and $G_2$ in FIG. 16. The upper limit of a frequency range in which the second term can be made small, is given by a frequency at which the above gain-frequency curves intersect with each other. This frequency is determined from the frequency component of the above-mentioned track offset.

In order for the transfer function $G_2$ to have such a frequency characteristic as shown in FIG. 16, it is necessary for the gain-frequency curve to have a steep slope. Accordingly, it is preferable to make the transfer function $G'_2$ nearly equal to the transfer function of a secondary low-pass filter while taking the sampling characteristic into consideration. The block diagram of FIG. 18 which indicates the operation of a control system, is not limited to the embodiment of FIG. 10 which includes only one actuator, but is applicable to the embodiment of FIG. 17 which includes two actuators. In this case, the transfer function $G_0$ is made equal to 1, and each of the transfer functions $G'_1$ and $G'_2$ includes the transfer function of a corresponding actuator.

Figure 19:
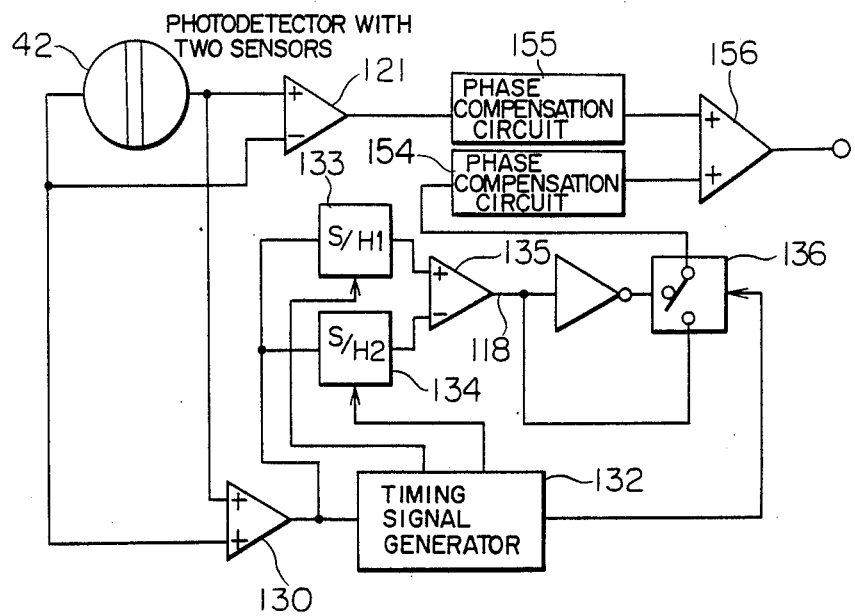
FIG. 19 is a block diagram showing still another example of a tracking-error detecting circuit used for a record carrier according to the present invention.
Figure 20:
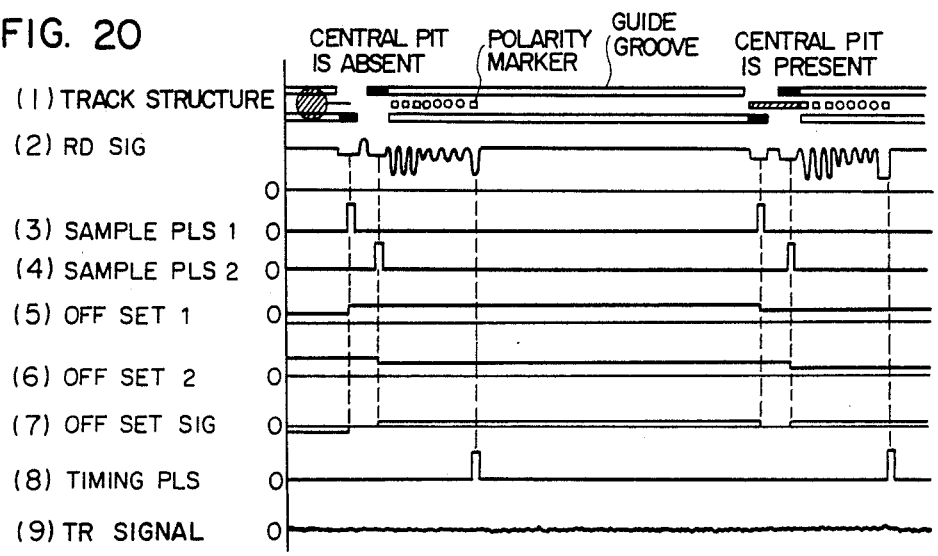
FIG. 20 is a diagram showing a track structure which has both the pit pattern of FIG. 6a and the pit pattern of FIG. 6b, and signals which are obtained from the track structure by the circuit of FIG. 19.
Figure 21:
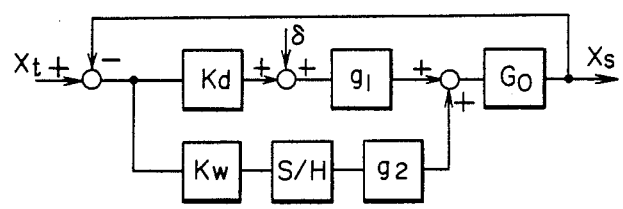
FIG. 21 is a block diagram showing the operation of the tracking-error detecting circuit of FIG. 19 in detail by using transfer functions.

Next, explanation will be made of an operation for detecting a tracking error signal from pit patterns of FIGS. 6a and 6b by the detection circuit of FIG. 19, by reference to FIG. 20. The detection circuit shown in FIG. 19 is similar to the detection circuit of FIG. 12 but is different therefrom in that the polarity marker 10 provided in the pit pattern or at a position just after the header field is detected, and the polarity of the tracking error signal 118 is reversed by, for example, an analog switch 136. The polarity of the tracking error signal 118 is reversed depending upon the presence or absence of the polarity marker 10 or the time duration of a signal caused by the polarity marker 10. Further, a signal from the least significant bit of an address counter included in the timing signal generation circuit 132 may be used in place of the signal due to the marker 10. The tracking error signal 118 obtained from a pit pattern and the tracking error signal 122 based upon the diffracted light from the guide groove pass through the phase compensation circuits 154 and 155, respectively, and are then applied to the adder 156, to form a tracking signal for a closed-loop servo system, thereby performing a tracking operation. FIG. 20 shows signal waveforms which appear at various parts of the above detection circuit when a track having the pit patterns of FIGS. 6a and 6b is traced with a light spot. Referring to FIG. 20, a track structure defined by adjacent guide grooves and including the above pit patterns is shown in the first row, and a signal RD SIG read out from the above track structure is shown in the second row. Further, timing signals SAMPLE PLS1 and SAMPLE PLS2 for detecting two signal levels of the read-out signal RD SIG which correspond to the pit patterns, are shown in the third and fourth rows, respectively. These timing signals are generated by the timing signal generation circuit 132. When the above two levels of the read-out signal RD SIG are detected by the timing signals, a signal OFFSET1 and a signal OFFSET2 are formed as shown in the fifth and sixth rows, respectively. These signals are applied to the differential amplifier 135, to obtain a difference signal therebetween. Thus, a tracking error signal OFFSET indicating the deviation of the light spot from the track is formed as shown in the seventh row. Further, the state of the polarity marker 10 is detected from the read-out signal RD SIG by a timing pulse TIMING PLS which is shown in the eighth row and is generated by the timing signal generation circuit 133, and then the polarity of the tracking error signal OFFSET SIG is reversed depending upon the state of the polarity marker 10. Then, the gain for the tracking error signal OFFSET SIG is adjusted, and the signal OFFSET SIG is added to the tracking error signal 122 based upon the diffracted light from the guide groove. Thus, a tracking signal TR is formed as shown in the ninth row of FIG. 20. A servo system corresponding to the above operation will be expressed by the block diagram of FIG. 21. In FIG. 21, reference symbol $X_t$ designates the movement of the track, $X_s$ the movement of the light spot, δ the track offset, $K_d$ the detection sensitivity for the tracking error signal based upon the pit patterns, $K_w$ the detection sensitivity for the tracking error signal based upon diffracted light from the guide groove, $g_1$ the transfer function of the detection system for the tracking error signal based upon diffracted light from the guide groove, $g_2$ the transfer function of the detection system for the tracking error signal based upon the pit patterns, and $G_0$ the transfer function of an actuator (that is, an actuator for a galvano-mirror, or a lens actuator). The ratio of $X_t$ to $X_s$ is given by the following equation:

$$\frac{X_s}{X_t} =$$

-continued $$\frac{G_0(K_d g_1 + K_w g_2)}{1 + G_0(K_d g_1 + K_w g_2)} + \frac{G_0 g_1}{1 + G_0(K_d g_1 + K_w g_2)} \left(\frac{\delta}{X_t}\right)$$

where the first term on the right-hand side indicates the closed-loop characteristic of an ordinary control system, and the second term indicates a residue due to the track offset. When the servo system has a transfer characteristic such as shown in FIG. 16, the low-frequency gain of the transfer function $g_2$ is 10 to 40 db higher than the gain of the transfer function $g_1$. Accordingly, the track offset is corrected, and a stable tracking operation can be performed.

A record carrier according to the present invention can be formed of another recordable optical disc using a recording layer in which reversible phase transformation can be made between the amorphous phase and the crystalline phase.

Further, a record carrier according to the present invention can also be formed of an adding type optical disc, in which holes can be formed in a recording layer on the basis of temperature rise due to light absorption. In this case, a high signal-to-noise ratio is obtained, and it is possible to carry out high-density recording for the optical disc and to perform a high-speed reproducing operation.

Further, the probability of detection failure at a time the errorless, tracking error is detected from a pit pattern, can be reduced by arranging a plurality of pit patterns having the same shape. It is needless to say that any pit pattern formed of a pit group which is distributed asymmetrically with respect to the center line between adjacent guide grooves can be used in a record carrier according to the present invention.

Further, any combination of the pit patterns shown in FIGS. 2, 3a to 3c, 4a to 4d, 5a to 5d and 6a to 6d, can be used in a record carrier according to the present invention.

As has been explained in the foregoing, according to the present invention, the offset component in the tracking signal can be corrected, and moreover the low-frequency gain of a tracking-signal detection system can be made high. Thus, a stable tracking operation can be performed.

Further, when a pit pattern is formed in an optical disc in accordance with the present invention, the noise due to the optical disc can be put to a low level. Specifically, in a case where the pit pattern is formed in a recordable optical disc, from which a reproduced signal having a low signal-to-noise ratio is read out, such as a magneto-optical disc, the signal-to-noise ratio of the reproduced signal is greatly improved.

Further, a master disc cutting apparatus according to the present invention can readily and stably form a guide groove, a header pit and a pit pattern on the same track of a master disc. A record carrier formed from the master disc which has been fabricated by the above cutting apparatus, can generate a reproduced signal which is 3 db lower in noise level than a reproduced signal from a conventional record carrier having a header pit on a guide groove. Further, the reproduced signal from a magneto-optical record carrier according to the present invention is about 1 db higher in signal level than the reproduced signal from the above conventional record carrier.

What is claimed is:

1. A record carrier having a track offset correction pattern comprising a disc-shaped substrate, a recording layer formed on said substrate, first and second regions alternately arranged along the rotational direction of the record carrier, guide grooves disposed in at least said second region and extending in the rotational direction of the record carrier while being spaced apart in the radial direction of the record carrier, a land extending in the rotational direction of the record carrier between adjacent guide grooves, said adjacent guide grooves serving as an optical guide for a light spot which follows on a center line between said adjacent guide grooves, said first region including said correction pattern for correcting track offset, and said correction pattern having at least first elements which are different in optical characteristic from said guide grooves and are provided in said first region while extending on center lines of said guide grooves so that said first elements of said adjacent guide grooves do not overlap each other when viewed in the radial direction of the record carrier, wherein said correction pattern further includes at least one second element which is different in optical characteristic from said guide grooves and is provided on said land in said first region on the center line between said adjacent guide grooves so that said at least one second element overlaps at least a respective one of said first elements of said adjacent guide grooves when viewed in the radial direction of the record carrier.

2. A record carrier according to claim 1, wherein a group formed of one of said first elements and said second element is asymmetric with respect to the center line between said adjacent guide grooves.

3. A record carrier according to claim 2, wherein each revolution of said land is divided into a plurality of sectors, each sector includes a header field in which a header signal including address information for identifying a respective sector is formed in advanced with pits of a phase structure, and a recording field which follows said header field, and wherein said first region is provided in said header field.

4. A recording carrier according to claim 2, wherein a mark for identifying said correction pattern is provided together with said correction pattern, on every other revolution of said land.

5. A record carrier having a track offset correction pattern comprising a disc-shaped substrate, a recording layer formed on said substrate, first and second regions alternatively arranged along the rotational direction of the record carrier, guide grooves disposed in at least said second region and extending in the rotational direction of the record carrier while being spaced apart in the radial direction of the record carrier, a land extending in the rotational direction of the record carrier between adjacent guide grooves, said adjacent guide grooves serving as an optical guide for a light spot which follows on a center line between said adjacent guide grooves, and first elements different in optical characteristic from said guide grooves and being provided in said first region while extending on center lines of said guide grooves so that said first elements of adjacent guide grooves do not overlap each other when viewed in the radial direction of the record carrier, said first elements of said adjacent guide grooves form said correction pattern for correcting track offset, wherein each revolution of said land is divided into a plurality of sectors, each sector including a header field in which a head signal including address information for identifying a respective sector is formed in advance with pits of a phase structure, and a recording field which follows said header field, and wherein said first region is provided in said header field, wherein said correction pattern further includes at least one second element which is different in optical characteristic from said guide grooves and is provided on said land in said first region on the center line between adjacent guide grooves so that said at least one second element overlaps at least a respective one of said first elements of adjacent guide grooves when viewed in the radial direction of record carrier.

6. A record carrier according to claim 5, wherein a group formed of one of said first elements and said at least one second element is asymmetric with respect to the center line between said adjacent guide grooves.

7. A record carrier according to claim 6, wherein said correction pattern further includes third elements which are different in optical characteristic from said guide grooves and are provided in said first region on respective center lines of said adjacent guide grooves so that each of said third elements overlaps said at least one second element so as to form said asymmetric group when viewed in the radial direction of the record carrier.

8. A record carrier according to claim 5, wherein a mark for identifying said correction pattern is provided together with said correction pattern, on every other revolution of said land.

9. A record carrier having a track offset correction pattern comprising a disc-shaped substrate, a recording layer formed on said substrate, first and second regions alternately arranged along the rotational direction of the record carrier, guide grooves disposed in at least said second region and extending in the rotational direction of the record carrier while being spaced apart in the radial direction of the record carrier, a land extending in the rotational direction of the record carrier between adjacent guide grooves, said adjacent guide grooves serving as an optical guide for a light spot which follows on a center line between the adjacent guide grooves, first elements different in optical characteristic from said guide grooves and being provided in said first region while extending on center lines of said guide grooves so that said first elements of said adjacent guide grooves do not overlap each other when viewed in the radial direction of the record carrier, at least one second element different in optical characteristic from said guide grooves and being provided in said first region while extending on the center line between adjacent guide grooves so that said at least one second element overlaps at least a respective one of said first elements of the adjacent guide grooves when viewed in the radial direction of the record carrier, and said first elements of said adjacent guide grooves and said at least one second element between said adjacent guide grooves form said correction pattern for correcting track offset.

10. A record carrier according to claim 9, wherein a group formed of one of said first elements and said second elements is asymmetric with respect to the center line between said adjacent guide grooves.

11. A record carrier according to claim 9, wherein each revolution of said land is divided into a plurality of sectors, each sector including a header field in which a header signal including address information for identifying a respective sector is formed in advance with pits of a phase structure, and a recording field which follows said header field, and wherein said first region is provided in said header field.

12. A record carrier according to claim 11, wherein a group formed of one of said first elements and said at least one second element is asymmetric with respect to the center line between said adjacent guide grooves.

13. A record carrier according to claim 12, wherein a mark for identifying said correction pattern is provided together with said correction pattern, on every other revolution of said land.

* * * * *